United States Patent [19]

Nakagawa et al.

[11] Patent Number: 4,553,844
[45] Date of Patent: Nov. 19, 1985

[54] CONFIGURATION DETECTING METHOD AND SYSTEM

[75] Inventors: Yasuo Nakagawa, Chigasaki; Yoshitada Oshida, Fujisawa; Kanji Ishige, Kanagawa, all of Japan

[73] Assignee: Hitachi, Ltd., Tokyo, Japan

[21] Appl. No.: 432,799

[22] Filed: Oct. 5, 1982

[30] Foreign Application Priority Data

Oct. 6, 1981 [JP] Japan .................. 56-158044

[51] Int. Cl.$^4$ .......................................... G01B 11/24
[52] U.S. Cl. .................................................. 356/376
[58] Field of Search .................. 356/1, 4, 376, 371

[56] References Cited

U.S. PATENT DOCUMENTS

| 3,667,846 | 6/1972 | Nater et al. | 356/376 |
| 3,885,875 | 5/1975 | Rosenfeld et al. | 356/376 |
| 4,171,917 | 10/1979 | Pirlet | 356/376 |

Primary Examiner—R. A. Rosenberger
Attorney, Agent, or Firm—Antonelli, Terry & Wands

[57] ABSTRACT

Method and system of detecting a configuration of a three-dimensional object, in which use is made of a spot beam to be directed to the object. The spot beam is caused to scan the object in a horizontal direction and the resulting spot image is detected through observation in a direction transverse to the horizontal direction. The system includes a laser light source, two Fourier transformation lenses having their Fourier transformation planes intersecting each other on the optical axes of the lenses on a light deflector, a photoelectric converter provided on the object plane of one of the lenses, the laser light source being disposed on the same meridian as the converter, and at least one reflecting mirror provided for forming a real image of the spot of the beam on the object.

11 Claims, 7 Drawing Figures

CONFIGURATION DETECTING METHOD AND SYSTEM

BACKGROUND OF THE INVENTION

The present invention relates generally to a method and system of detecting the configuration of very small three-dimensional objects such as soldered portions or mounted parts on printed circuit boards, and more specifically, to a configuration detecting method and system which can eliminate noises resulting from the secondary and tertiary reflections on a surface of an object to be checked.

A recent tendency of semiconductor techniques is to increase the packing density of electronic parts to be mounted on a printed circuit board. As the semiconductor techniques advances, it has been demanded to develop the associated techniques. In respect of product quality control, in particular, the development of inspection techniques is indispensable.

An example of a prior-art configuration detection will be explained with reference to FIG. 1 in the case where electronic-part soldering portions on a printed circuit board are to be inspected.

In FIG. 1, leads 2 for an electronic part 1 are soldered onto respective lands 4 formed on a printed circuit board 3. For inspection of the configuration of such soldered portions, there has been, so far, used a light section method wherein, as shown in FIG. 2, a slit-shaped bright light is projected onto the soldered portions from a slit projector 6 disposed above the soldered portions so that an image detector 7 disposed obliquely at an angle with respect to the projected light can detect the configuration of the checked portions.

In the conventional method, as illustrated in FIG. 3, the detector 7 detects the image of the projected slit light segments 8 to 12 in the form of light section image of a three-dimensional object, whereby the configuration of the checked object can be determined.

However, if the objects to be checked have mirror or glossy surfaces as in the case of the illustrated soldered portions, then the slit bright light will be reflected on such surfaces. For example, in FIG. 3, the slit light segment 8 is regularly reflected on a soldered fillet portion 5, whereby the reflected light 13 is undesirably detected as if it were an actual slit bright light. Similarly, numeral 14 is a regularly reflected light of the slit light segment 12. Further, in the case where objects to be checked have mirror or glossy surfaces, it may also happen that the slit light segments 9 and 11 become darker than the reflected lights 13 and 14.

As a result, the prior art has such a defect that it is impossible to obtain a real light section image because of such abnormal reflections.

SUMMARY OF THE INVENTION

Accordingly, it is an object of the present invention to provide a method and system of detecting the configuration of very small three-dimensional objects which eliminates the above defect in the prior art.

That is, in the present invention, in order to prevent the erroneous detecting of configuration of a checked object due to abnormal reflection on the surface of the object, a spot-shaped light in place of a conventional slit-shaped bright light is directed or illuminated onto the object to be checked and scanned in its horizontal direction so that the every spot image at every moment on the detecting real image plane observed from a direction perpendicular to the spot scanning direction is detected, and more specifically, two Fourier transformation lenses are arranged to be symmetrical with respect to a light deflector such as a galvano-mirror so that the Fourier transformation planes of the two lenses intersect with each other on the deflector, a laser beam source and a photoelectric converter such as a one-dimensional image sensor are provided on an object plane of one of the lenses, two reflecting mirrors are provided so that the laser spot coincides with the corresponding object point of the converter on an object image plane of the other lens, the laser spot is scanned on the object to be checked via the two mirrors by means of the deflector so as to form the real image of the laser spot always on the converter.

DESCRIPTION OF THE PREFERRED EMBODIMENTS

Figure 4:
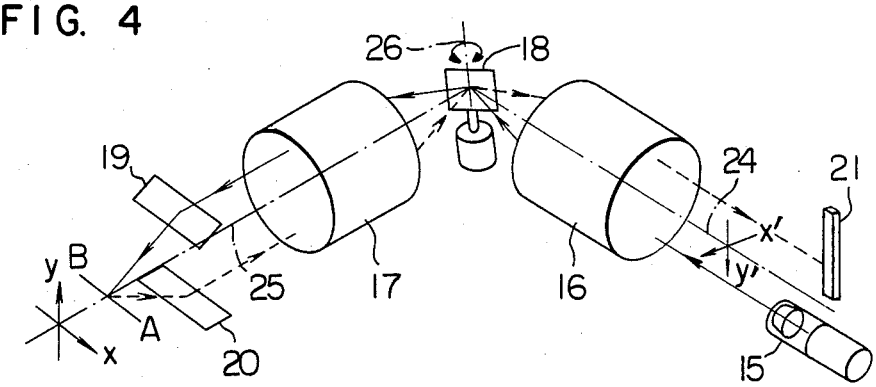
FIG. 4 is an arrangement of an optical detection system in accordance with an embodiment of the present invention.
Figure 5:
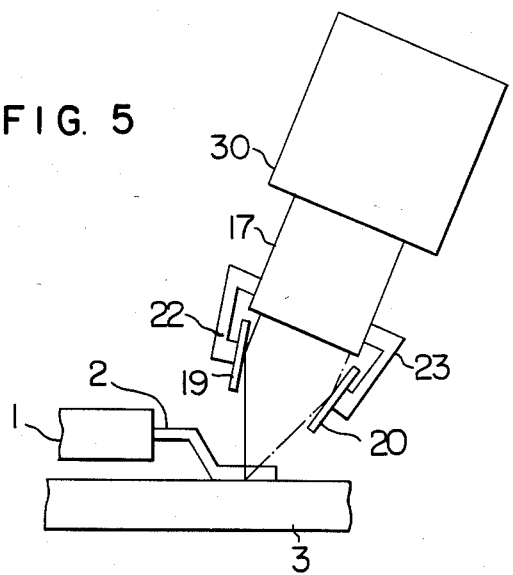
FIG. 5 is a side view of a practical apparatus having such an optical arrangement as shown in FIG. 4.

Referring first to FIG. 4, there is shown an arrangement of an optical configuration detecting system as an embodiment of the present invention, wherein reference numeral 24 denotes an optical axis of a Fourier transformation lens 16, numeral 25 denotes an optical axis of another Fourier transformation lens 17, and numeral 26 denotes a center of rotation of a light deflector 18. Further, reference symbol x indicates a horizontal axis and symbol y indicates an axis perpendicular or vertical to the x axis, both passing through the optical axis 25. Similarly, symbols x' and y' respectively indicate horizontal and vertical axes both passing through the optical axis 24. The two Fourier transformation lenses 16 and 17 are arranged so that the respective optical axes 24 and 25 will lie in a plane perpendicular to the rotary center 26 of the deflector 18 and will intersect or meet each other on the deflector 18. A light emitting point of a laser beam source 15 which constitutes a spot light source is positioned at a position offset from the optical axis 24 in the y' direction on the object plane of the Fourier transformation lens 16 so that a laser beam will be emitted in parallel with the axis 24 from the light source 15. A photoelectric converter 21 is arranged on the same meridian as the laser beam source 15. Further, reflecting mirrors 19 and 20 are arranged so that a laser spot beam from the lens 17 is reflected at the mirror 19 to form a laser spot image on an object to be checked and the laser spot beam is again entered into the Fourier transformation lens 17. FIG. 5 shows a practical embodiment of an apparatus having the arrangement of FIG. 4, wherein a head portion 30 contains the laser beam source 15, Fourier transformation lens 16, light deflector 18 and photoelectric converter 21 in such a positional relation as has been explained in FIG. 4. Further, the reflecting mirrors 19 and 20 are carried on the Fourier transformation lens 17 by means of mirror mounting mechanisms 22 and 23.

It should be understood to those skilled to the art, as a matter of course that mechanisms for holding the respective constituent parts, peripheral electric circuits and covers for shielding external disturbance lights are omitted in FIGS. 4 and 5.

Next, explanation will be directed to the inspection principle of this embodiment.

First, a laser beam (shown by a solid line arrow), emitted from the laser beam source 15, enters into the Fourier transformation lens 16 and Fourier transformed thereby. The thus Fourier transformed laser beam, reflected by the light deflector 18, enters into the other Fourier transformation lens 17 in a slanted direction with respect to the optical axis 25. On the other hand, the rotary center 26 of the deflector 18 is set to be on the Fourier transformation plane of the lens 17 and the object to be checked is disposed in the vicinity of the optical axis 25 and on the object plane of the Fourier transformation lens 17 with the reflecting mirrors 19 and 20 being interposed between the lens 17 and its object plane. The plane of the mirror 19 parallel to the x axis is inclined so that the laser beam emitted from the lens 17 in a parallel relation to the optical axis 25, reflected by the mirror, will intersect the x axis on the object plane. Under this condition, a laser beam reflected at the light deflector 18 is Fourier inverse-transformed by the Fourier transformation lens 17 and then reflected by the mirror 19, whereby the laser spot is formed on the object to be checked. When the light deflector 18 oscillates around the rotary center 26, the light beam from the deflector 18 will vary in orientation, whereby the laser spot will be moved in a direction parallel to the x axis, for example, from a point A to a point B in FIG. 4. In this way, scanning operation of the laser spot can be realized.

On the detection side, on the other hand, the laser spot, as shown by a broken line arrow in FIG. 4, enters into the Fourier transformation lens 17 via the reflecting mirror 20 in the form of a light beam parallel to the optical axis 25 to obtain a Fourier-transformed image. The obtained image is then changed into a light beam which obliquely intersects with the optical axis 24 at the deflector 18. Then, the light beam from the lens 17 is reflected by the light deflector 18 and passes through on a plane defined by the axis 24 and y' axis and further Fourier-inverse-transformed by the lens 16, whereby the real image of the laser spot is formed or imaged on the photoelectric converter 21 which is disposed on the meridian offset from the optical axis 24 in the y' direction and on the object plane of the lens 16. Since the x direction scanning of the laser spot is effected by rotation of the light deflector 18, the real image of the laser spot sent through the light deflector 18 and the lens 16 will be formed or imaged always on the photoelectric converter 21 on the object plane of the lens 16. And, in dependence upon the differing height of the checked object the real image of the laser spot will be displaced or moved in the y' axis direction on the converter 21.

The optical system described above is arranged so that the laser beam reflected by the mirror 19 will be vertically directed or illuminated to the object to be checked and the beam will be detected from the other direction from that of the illuminated beam via the mirror 20. In the embodiment shown in FIG. 5, the laser spot on the checking object will be scanned in a direction vertical to the paper face of the drawing.

By combining the scanning by the vibratory movement of the light deflector 18 (x direction scanning) with the internal scanning (y' direction scanning) of the photoelectric converter 21 in which for one scanning operation of the deflector 18 multiple times of the internal scanning thereof are made, a light section image can be obtained from the photoelectric converter 21.

Figure 1:
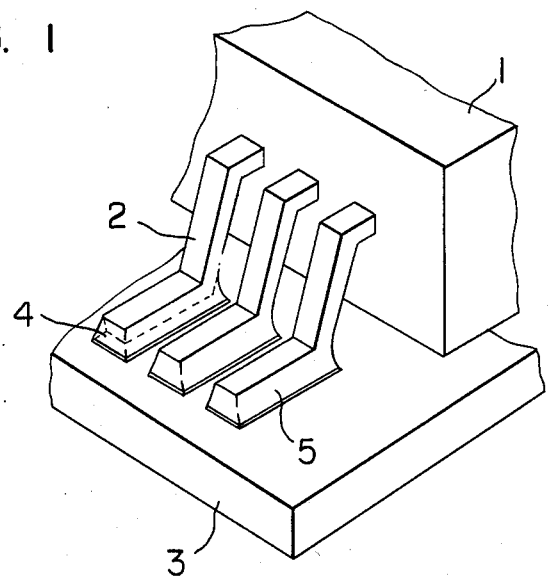
FIG. 1 is a perspective view of a portion of an exemplary object to be checked in which leads of electronic parts are soldered to lands formed on a printed circuit board.
Figure 2:
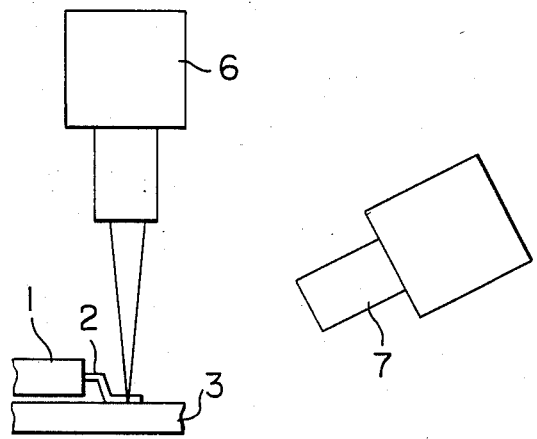
FIG. 2 is a schematic arrangement of a prior-art system for detecting the configuration of such an object to be checked as shown in FIG. 1.
Figure 3:
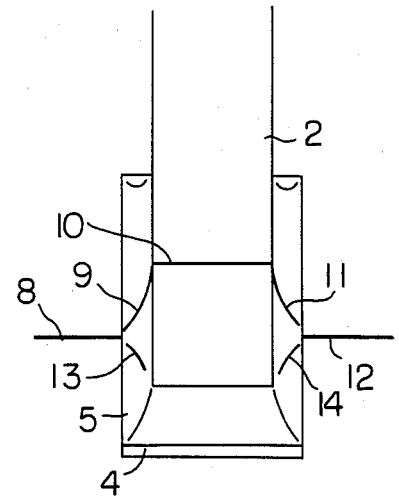
FIG. 3 is a schematic top view of one of the leads in FIG. 1, as an example of an object, for explaining the defect in the prior-art method.
Figure 6:
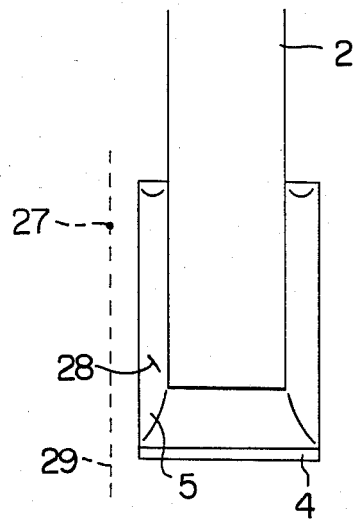
FIGS. 6 and 7 are explanatory views for showing a relation between a laser spot position and its detection position in the embodiment of the invention.
Figure 7:
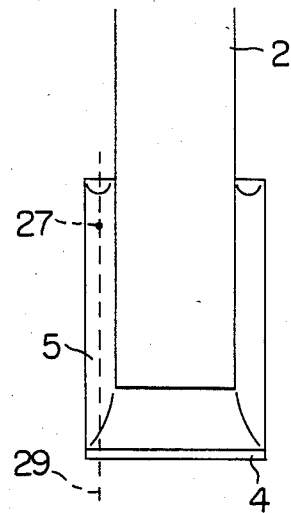

Next, the operation of this embodiment will be explained. In FIG. 6, a laser spot 27 is positioned on a printed circuit board or substrate. Under this condition, the laser spot 27 will be reflected on the fillet 5, whereby its reflected image 28 will appear. Such a reflected image 28 corresponds to the reflected light 13 occurred in FIG. 3 (prior art). However, at this point, the converter 21 can detect only a position shown by a broken line 29 and thus can not detect the reflected image 28. When the laser spot 27 is directed onto the soldered fillet 5 as shown in FIG. 7, the spot will not exist on the printed circuit substrate. Accordingly, since the reflected image 28 will not exist on the detection position 29, the converter 21 can detect only the image of the spot 27.

In the embodiment described in the foregoing, the photoelectric converter 21 may be a one-dimensional linear image sensor for receiving the light section image itself, the image sensor having a length extending in the y' direction, as shown in FIG. 4.

Further, simply for detection of the y coordinate position of the laser spot image, a position sensor such as a pin-photo-diode may be used.

Although the laser spot has been illuminated vertically on the object to be checked and been detected from a different angle as shown in FIG. 5 in the above illustrated embodiment, it will be readily appreciated to those skilled in the art that the laser spot may be illuminated on the to be checked object from one side of the object and be detected from the vertical direction or from the other side of the object as in the prior art light cross section method, as necessary. Further, as the light deflector, a galvano-mirror, a rotary polygonal mirror, rotary mirror or an acoustic optic deflector may be employed. In addition, the illumination and detection lights have been both reflected or deflected by the two reflecting mirrors in the above embodiment, but the invention is not limited to this embodiment. For example, either of the illumination or detection lights may be reflected by a mirror and the other light may be observed directly without using a mirror.

As has been disclosed in the foregoing, according to the present invention, the two Fourier transformation lenses are used to form a laser spot on the object to be checked, the laser spot is scanned by the light deflector, and the spot is detected as its real image by the photoelectric converter. As a result, the scanning laser beam alone can be detected without its reflected image being detected, and even if a checked object has a mirror or glossy surface, noises resulting from the secondary and tertiary reflections on the object surface can be completely eliminated, whereby the configuration of very small three-dimensional objects can be accurately checked.

We claim:

1. A configuration detecting method comprising the steps of passing a laser beam from a laser beam source into a first Fourier transformation lens, reflecting said transformed laser beam by a light deflector, passing said reflected light beam into a second Fourier transformation lens for Fourier inverse transformation, reflecting said inversely-transformed laser beam by a first reflecting mirror to form a laser beam spot on an object to be checked, passing said spot beam into said second lens in the form of a light beam by means of a second reflecting mirror, and passing said spot beam from said second lens into said first lens in the form of a light beam by means of said deflector to form a real image of the laser spot on a photoelectric converter.

2. A configuration detecting method according to claim 1, wherein the laser beam source generates a spot-like laser beam, and the photoelectric converter is a linear image sensor.

3. A configuration detecting method according to claim 2, wherein the first and second Fourier transformation lenses are arranged so that Fourier transformation planes of the lenses intersect each other on optical axes of both lenses, the light deflector being disposed along a line defined by the intersection of the Fourier transformation planes.

4. A configuration detecting method according to claim 3, wherein the light deflector includes a galvano-mirror.

5. A configuration detecting system comprising a laser beam source means for generating a laser beam, a first Fourier transformation lens for receiving the generated laser beam and for transforming the generated laser beam, a light deflector means arranged for reflecting the transformed laser beam from the first Fourier transformation lens, a second Fourier transformation lens for receiving the reflected transformed laser beam and for providing a Fourier inverse transformation thereof, a first reflecting mirror means for reflecting the inversely-transformed laser beam so as to form a laser beam spot on an object to be checked, means for passing light from said laser beam spot on the object to be checked into said second Fourier transformation lens as a light beam, said light deflector means receiving the light beam of said laser spot beam passing through said second Fourier transformation lens and for deflecting said light beam into said first lens so as to form a real image of the laser spot on a photoelectric converter means.

6. A configuration detecting system according to claim 5, wherein said first and second Fourier transformation lenses are arranged so that Fourier transformation planes of both lenses intersect on optical axes of both lenses, said deflector means being arranged along a line of intersection of the Fourier transformation planes of both lenses.

7. A configuration detecting system according to claim 6, wherein said laser beam from said laser beam source passes through said first and second Fourier transformation lenses in one direction and light of the laser beam spot on the object to be checked passes through said second and said first Fourier transformation lenses in an opposite direction.

8. A configuration detecting system according to claim 6, wherein said photoelectric converter means includes a linear image sensor, said linear image sensor being provided on an object plane of said first Fourier transformation lens and said laser beam source being provided on the same meridian as said linear image sensor.

9. A configuration detecting system according to claim 6, wherein said means for passing light from the laser beam spot into said second Fourier transformation lens includes a second reflecting mirror.

10. A configuration detecting system according to claim 9, wherein said first and second reflecting mirrors are arranged symmetrically with respect to the optical axes of said second Fourier transformation lens.

11. A configuration detecting system according to claim 6, wherein said light deflector means includes a galvano-mirror.

* * * * *